United States Patent
Yamanaka (10) Patent No.: US 11,584,297 B2
(45) Date of Patent: Feb. 21, 2023

(54) DISPLAY DEVICE FOR VEHICLE AND PARKING ASSIST SYSTEM

(71) Applicant: HONDA MOTOR CO., LTD., Tokyo (JP)

(72) Inventor: Hiroshi Yamanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 17/096,008

(22) Filed: Nov. 12, 2020

(65) Prior Publication Data

US 2021/0178968 A1   Jun. 17, 2021

(30) Foreign Application Priority Data

Dec. 13, 2019   (JP) .............................. JP2019-225940

(51) Int. Cl.
*B60R 1/00* (2022.01)
*B62D 15/02* (2006.01)
*B60K 35/00* (2006.01)

(52) U.S. Cl.
CPC .............. *B60R 1/00* (2013.01); *B60K 35/00* (2013.01); *B62D 15/0285* (2013.01);
(Continued)

(58) Field of Classification Search
CPC .............. B60R 1/00; B60R 2300/102; B60R 2300/105; B60R 2300/303;
(Continued)

(56) References Cited

U.S. PATENT DOCUMENTS

2011/0166782 A1*   7/2011   Watanabe ................. B60R 1/00
                                                 348/E7.087
2012/0170812 A1*   7/2012   Kamiyama ........... G06T 3/4038
                                                      382/103
(Continued)

FOREIGN PATENT DOCUMENTS

JP   H04239400 A   8/1992
JP   2013006548 A   1/2013
JP   2019151304 A   9/2019

OTHER PUBLICATIONS

Notice of Reasons for Refusal for Patent Application JP 2019-225940 dated Jul. 20, 2021; 14 pp.

*Primary Examiner* — Nathnael Aynalem
(74) *Attorney, Agent, or Firm* — Armstrong Teasdale LLP (57) ABSTRACT

A display device for a vehicle includes: a plurality of imaging units configured to capture images around the vehicle; an image compositing unit configured to composite the images captured by the imaging units to generate a composite image; an image display unit configured to display the composite image generated by the image compositing unit; and an acquiring unit configured to acquire information about an object around the vehicle. The imaging units are arranged such that imaging areas thereof overlap with each other. The image compositing unit is configured to set a boundary between the captured images in the composite image such that the boundary is provided in a part where the imaging areas of the imaging units overlap with each other. In a case where the acquiring unit acquires the information about the object, the image compositing unit changes the boundary.

8 Claims, 6 Drawing Sheets

(52) U.S. Cl.
CPC ... *B60K 2370/176* (2019.05); *B60R 2300/101* (2013.01); *B60R 2300/105* (2013.01); *B60R 2300/303* (2013.01); *B60R 2300/607* (2013.01); *B60R 2300/806* (2013.01); *B60R 2300/8086* (2013.01)

(58) Field of Classification Search
CPC ........ B60R 2300/307; B60R 2300/802; B60R 2300/8093; B60R 2300/607; B60R 2300/806; B60R 2300/8086; B60R 2300/605; G06T 15/00; G06T 2207/20212; G06T 2207/20221; G06T 2207/30261; G06T 7/70; B60K 2370/176; B60K 35/00
USPC ........................................................ 348/148
See application file for complete search history.

(56) References Cited

U.S. PATENT DOCUMENTS

| | | | |
|---|---|---|---|
| 2012/0219190 A1* | 8/2012 | Kumagai | .................. G06T 7/55 382/104 |
| 2014/0354452 A1 | 12/2014 | Okuyama | |
| 2015/0281594 A1* | 10/2015 | Sakaniwa | .............. H04N 5/265 348/218.1 |
| 2019/0275970 A1 | 9/2019 | Sato et al. | |
| 2019/0281229 A1* | 9/2019 | Sakuragi | ............... G06T 3/4038 |
| 2019/0351824 A1* | 11/2019 | Kim | .......................... G06T 7/11 |

* cited by examiner

DISPLAY DEVICE FOR VEHICLE AND PARKING ASSIST SYSTEM

TECHNICAL FIELD

The present invention relates to a display device for a vehicle and a parking assist system including the same.

BACKGROUND ART

Conventionally, various methods for displaying surroundings of a vehicle have been proposed. For example, JPH4-239400A discloses an on-board surveillance camera device including an imaging means, an image processing means, and a display means. The imaging means is mounted on a vehicle to capture images around the vehicle in desired directions. The image processing means converts and composites the images captured by the imaging means so that the driver of the vehicle can easily see the image. The display means displays the images composited by the image processing means.

By the way, in a case where a display device for a vehicle includes a plurality of imaging units configured to capture images around the vehicle, the images captured by the imaging units may be composited to generate a composite image, and this composite image may be displayed on a display (for example, an inboard touch panel). In such a case, depending on the position of an object around the vehicle, it may be difficult to appropriately generate the composite image near the boundary of the images captured by the imaging units.

SUMMARY OF THE INVENTION

In view of such a problem of the prior art, a primary object of the present invention is to provide a display device for a vehicle that can generate an appropriate composite image according to the position of the object around the vehicle.

To achieve such an object, one embodiment of the present invention provides a display device (3) for a vehicle (V), including: a plurality of imaging units (51, 52) configured to capture images around the vehicle; an image compositing unit (41) configured to composite the images captured by the imaging units to generate a composite image; an image display unit (32) configured to display the composite image generated by the image compositing unit; and an acquiring unit (61) configured to acquire information about an object (Z) around the vehicle, wherein the imaging units are arranged such that imaging areas (I1, I2) thereof overlap with each other, the image compositing unit is configured to set a boundary (Yr) between the captured images in the composite image such that the boundary is provided in a part (Xr) where the imaging areas of the imaging units overlap with each other, and in a case where the acquiring unit acquires the information about the object, the image compositing unit changes the boundary.

According to this arrangement, the boundary between the captured images can be changed according to the position of the object around the vehicle. Accordingly, it is possible to generate an appropriate composite image according to the position of the object around the vehicle.

In the above arrangement, preferably, the imaging units include a first imaging unit (51) configured to capture an image in a first imaging area (I1) and a second imaging unit (52) configured to capture an image in a second imaging area (I2) that overlaps with the first imaging area, the acquiring unit is configured to acquire the information about the object in the first imaging area, and in the case where the acquiring unit acquires the information about the object, the image compositing unit moves the boundary such that the boundary gets closer to the first imaging unit as compared with a case where the acquiring unit does not acquire the information about the object.

According to this arrangement, it is possible to enhance the accuracy of the position of the object in the composite image by moving the boundary in an appropriate direction.

In the above arrangement, preferably, in the case where the acquiring unit acquires the information about the object, the image compositing unit enlarges a use area of the image captured by the second imaging unit and reduces a use area of the image captured by the first imaging unit as compared with the case where the acquiring unit does not acquire the information about the object.

According to this arrangement, the use area of the image captured by the second imaging unit (the imaging unit with an imaging area in which the information about the object is not acquired) can be enlarged, while the use area of the image captured by the first imaging unit (the imaging unit with an imaging area in which the information about the object is acquired) can be reduced. Accordingly, it is possible to further enhance the accuracy of the position of the object in the composite image.

In the above arrangement, preferably, the first imaging unit includes a side imaging unit configured to capture an image on a lateral side of the vehicle, the second imaging unit includes a rear imaging unit configured to capture an image on a rear side of the vehicle, the acquiring unit includes at least one side acquiring unit configured to acquire the information about the object on the lateral side of the vehicle, and in a case where the side acquiring unit acquires the information about the object, the image compositing unit moves the boundary to a front side of the vehicle as compared with a case where the side acquiring unit does not acquire the information about the object.

According to this arrangement, in a case where the object is present on the lateral side of the vehicle and thus the position of the object in the composite image is likely to deviate from the position of the object in the actual space, it is possible to suppress the deviation thereof.

In the above arrangement, preferably, the side imaging unit is arranged more forward than a fore and aft center of the vehicle, the at least one side acquiring unit includes a plurality of side acquiring units including a front side acquiring unit arranged more forward than the fore and aft center of the vehicle and a rear side acquiring unit arranged more rearward than the fore and aft center of the vehicle, and in a case where the rear side acquiring unit acquires the information about the object, the image compositing unit moves the boundary to the front side of the vehicle as compared with a case where the rear side acquiring unit does not acquire the information about the object.

According to this arrangement, in a case where the object is present on the lateral side of a rear part of the vehicle and thus the position of the object in the composite image is more likely to deviate from the position of the object in the actual space, it is possible to suppress the deviation thereof.

In the above arrangement, preferably, the display device further includes a front acquiring unit (63) configured to acquire the information about the object on the front side of the vehicle and a rear acquiring unit (62) configured to acquire the information about the object on the rear side of the vehicle, the front acquiring unit and the rear acquiring unit being separate from the side acquiring unit, wherein in a case where the front acquiring unit or the rear acquiring unit acquires the information about the object, the image compositing unit does not move the boundary.

According to this arrangement, it is possible to suppress the discomfort caused by the movement of the boundary by reducing an unnecessary movement of the boundary.

In the above arrangement, preferably, the display device further includes a front acquiring unit configured to acquire the information about the object on the front side of the vehicle and a rear acquiring unit configured to acquire the information about the object on the rear side of the vehicle, the front acquiring unit and the rear acquiring unit being separate from the side acquiring unit, wherein in a case where the front acquiring unit or the rear acquiring unit acquires the information about the object, the image compositing unit moves the boundary.

According to this arrangement, in a case where the object is present on the front side or the rear side of the vehicle, it is possible to suppress the deviation of the position of the object in the composite image from the position of the object in the actual space.

In the above arrangement, preferably, the boundary has a prescribed length in a circumferential direction around the vehicle, and in the case where the acquiring unit acquires the information about the object, the image compositing unit moves the boundary such that the boundary after a movement thereof overlaps with the boundary before the movement thereof.

According to this arrangement, it is possible to suppress the discomfort caused by the movement of the boundary by reducing the movement length of the boundary.

In the above arrangement, preferably, the imaging units include a first imaging unit configured to capture an image in a first imaging area and a second imaging unit configured to capture an image in a second imaging area that overlaps with the first imaging area, the acquiring unit is configured to acquire the information about the object in the first imaging area, the image compositing unit is configured to generate a corresponding part of the composite image by blending the image captured by the first imaging unit and the image captured by the second imaging unit, the corresponding part being a part corresponding to the boundary, and in the case where the acquiring unit acquires the information about the object, the image compositing unit changes a blending rate of the captured images in the corresponding part of the composite image such that a proportion of the image captured by the second imaging unit increases and a proportion of the image captured by the first imaging unit decreases as compared with a case where the acquiring unit does not acquire the information about the object.

According to this arrangement, the proportion of the image captured by the second imaging unit (the imaging unit with an imaging area in which the information about the object is not acquired) can be increased, while the proportion of the image captured by the first imaging unit (the imaging unit with an imaging area in which the information about the object is acquired) can be decreased. Accordingly, it is possible to further enhance the accuracy of the position of the object in the composite image.

In the above arrangement, preferably, the composite image generated by the image compositing unit is a plan view image in which the vehicle is looked down on from right above.

According to this arrangement, with regard to the plan view image in which the position of the object in the composite image is likely to deviate from the position of the object in the actual space, it is possible to suppress the deviation thereof.

To achieve the above object, another embodiment of the present invention provides a parking assist system (1) including the above display device, wherein the image display unit is configured to display a parking position candidate (P) in the composite image.

According to this arrangement, it is possible to reduce the occurrence of a situation in which the object and the parking position candidate overlap with each other in the composite image even though they do not overlap with each other in the actual space.

Thus, according to the above arrangements, it is possible to provide a display device for a vehicle that can generate an appropriate composite image according to the position of the object around the vehicle.

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
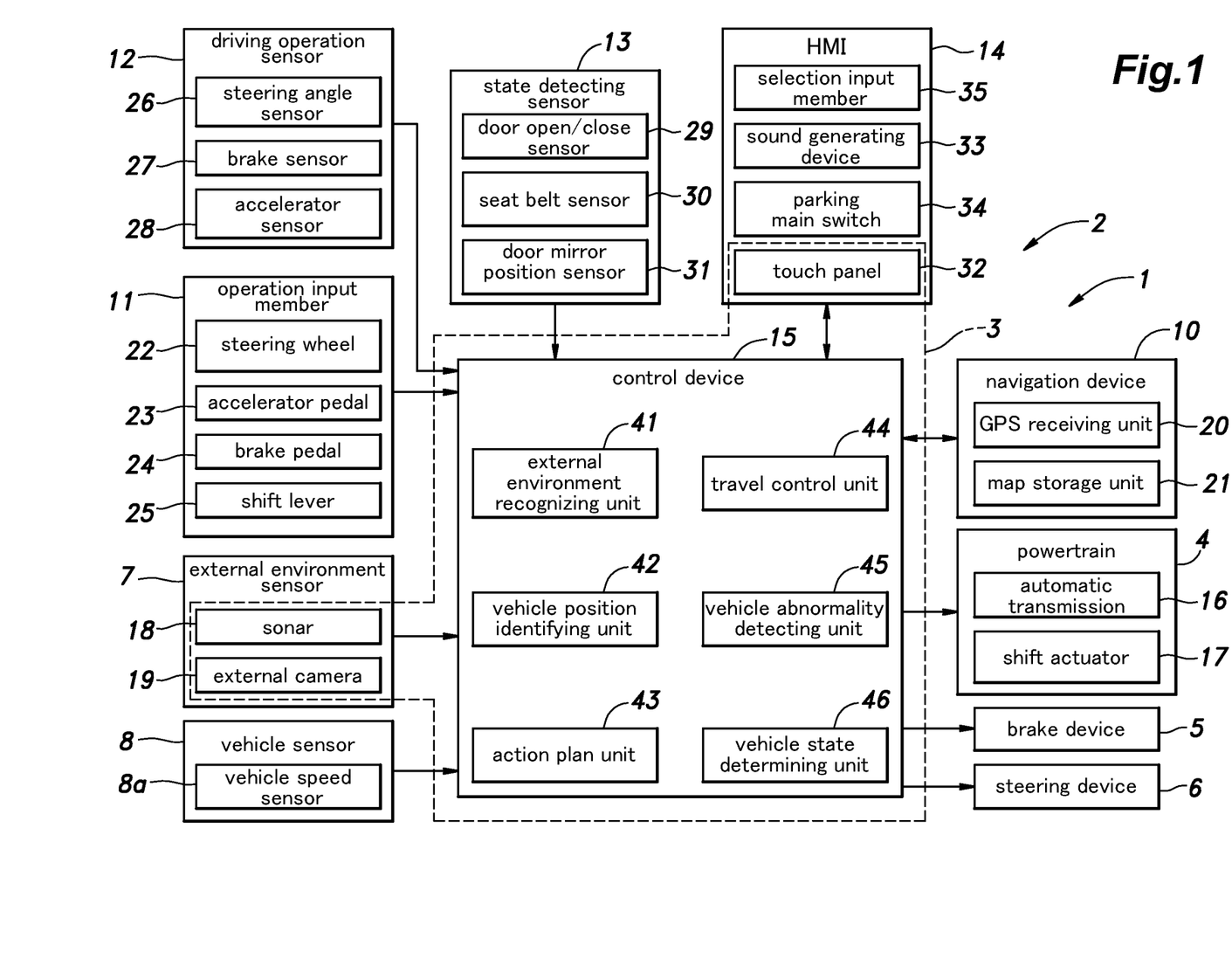
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply a brake pressure (an oil pressure) to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object, thereby detecting the position (distance and direction) of the object. Plural sonars 18 are provided at each of a rear portion and a front portion of the vehicle. In the present embodiment, a pair of sonars 18 are provided on a rear bumper so as to be spaced laterally from each other, a pair of sonars 18 are provided on a front bumper so as to be spaced laterally from each other, and four sonars 18 are provided at front and rear ends of both lateral surfaces of the vehicle, respectively. Namely, the vehicle is provided with eight sonars 18 in total. The sonars 18 provided on the rear bumper mainly detect the positions of the objects behind the vehicle. The sonars 18 provided on the front bumper mainly detect the positions of the objects in front of the vehicle. The sonars 18 provided at the front ends of both lateral surfaces of the vehicle detect the positions of the objects on left and right outsides of the front end of the vehicle, respectively. The sonars 18 provided at the rear ends of both lateral surfaces of the vehicle detect the positions of the objects on left and right outsides of the rear end of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor 8a configured to detect the vehicle speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the vehicle speed sensor 8a consists of plural wheel speed sensors. Each wheel speed sensor is configured to detect the wheel speed (the rotational speed of each wheel). For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (shift member). The shift lever 25 is configured to receive an operation for switching the shift position of the vehicle.

The driving operation sensor 12 detects an operation amount of the operation input member 11. The driving operation sensor 12 includes a steering angle sensor 26 configured to detect a turning angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the HMI 14, the control device 15, and the external environment sensor 7.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a vehicle stopper (wheel stopper) or an obstacle is present, and obtains the size of the vehicle stopper or the obstacle in a case where the vehicle stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

Figure 2:
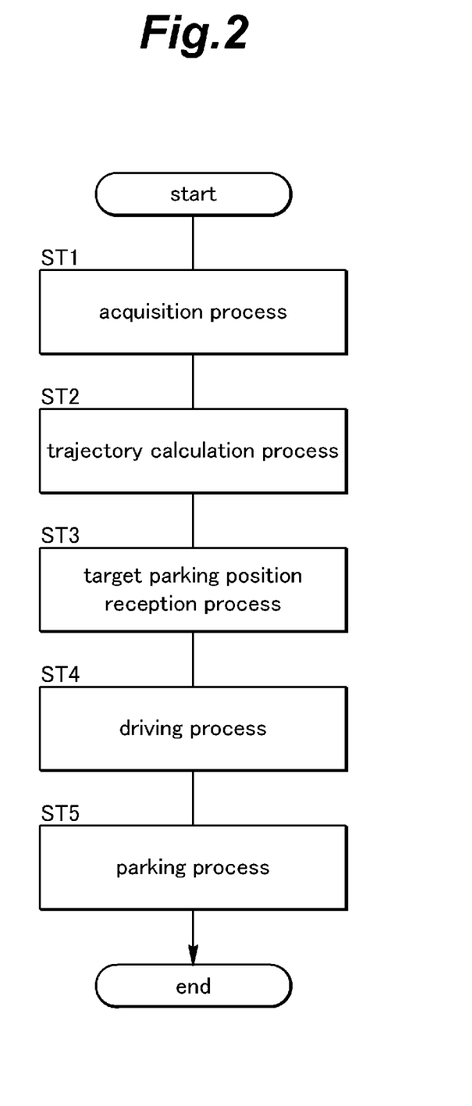
FIG. 2 is a flowchart of an automatic parking process in the parking assist system according to the embodiment.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Figure 3A:
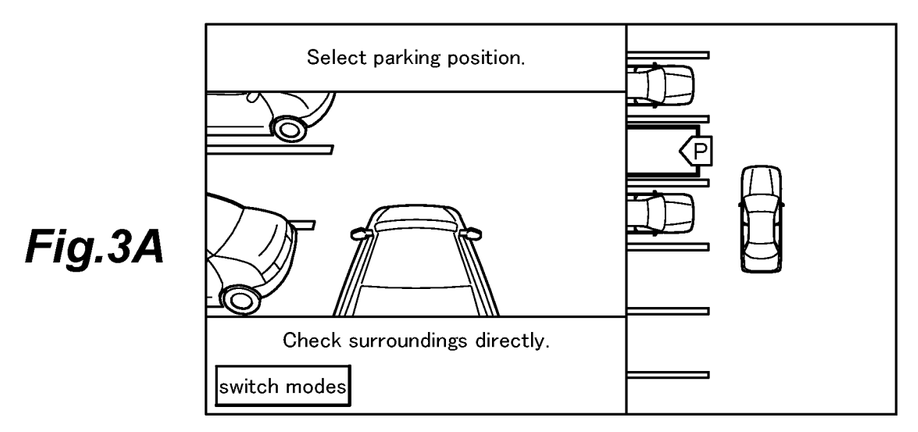
FIG. 3A is a diagram showing a screen display of a touch panel during a target parking position reception process in the parking assist system according to the embodiment.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
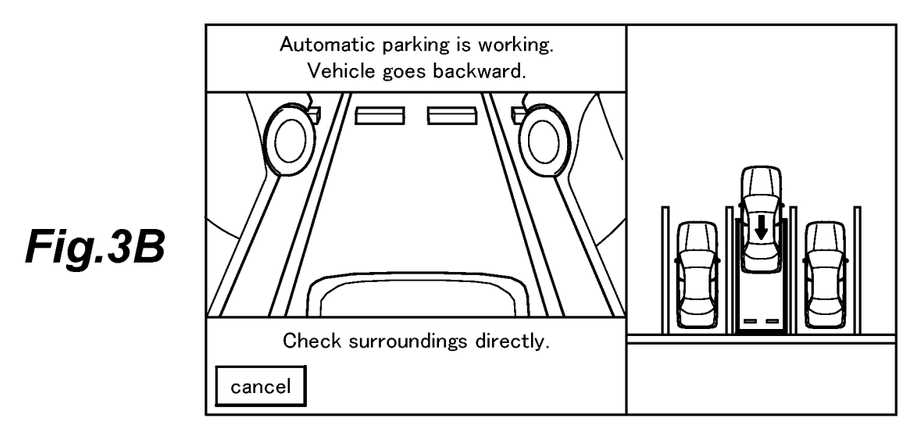
FIG. 3B is a diagram showing the screen display of the touch panel during a driving process in the parking assist system according to the embodiment.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

Figure 3C:
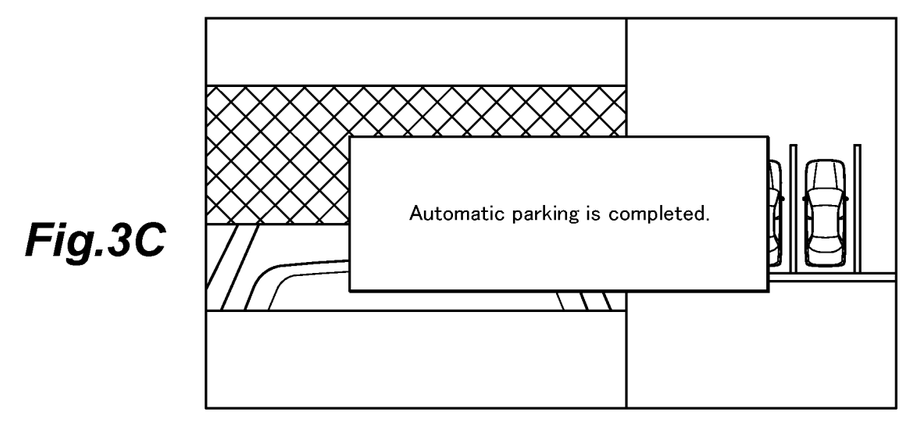
FIG. 3C is a diagram showing the screen display of the touch panel when automatic parking is completed in the parking assist system according to the embodiment.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

<The Display Device 3 for the Vehicle V>

Next, with reference to FIGS. 1 and 4, a display device 3 for the vehicle V (hereinafter abbreviated as "the display device 3") provided in the parking assist system 1 will be described. In the following, an expression "the circumferential direction" will indicate the circumferential direction around the vehicle V.

With reference to FIG. 1, the display device 3 includes the external cameras 19 (an example of imaging units) configured to capture images around the vehicle V, the control device 15 (an example of an image compositing unit) configured to composite the images captured by the external cameras 19 to generate a composite image, the touch panel 32 (an example of an image display unit) configured to display the composite image generated by the control device 15, and the sonars 18 (an example of acquiring units) configured to acquire information about the object around the vehicle V. In the following, these components of the display device 3 will be described one by one.

Figure 4:
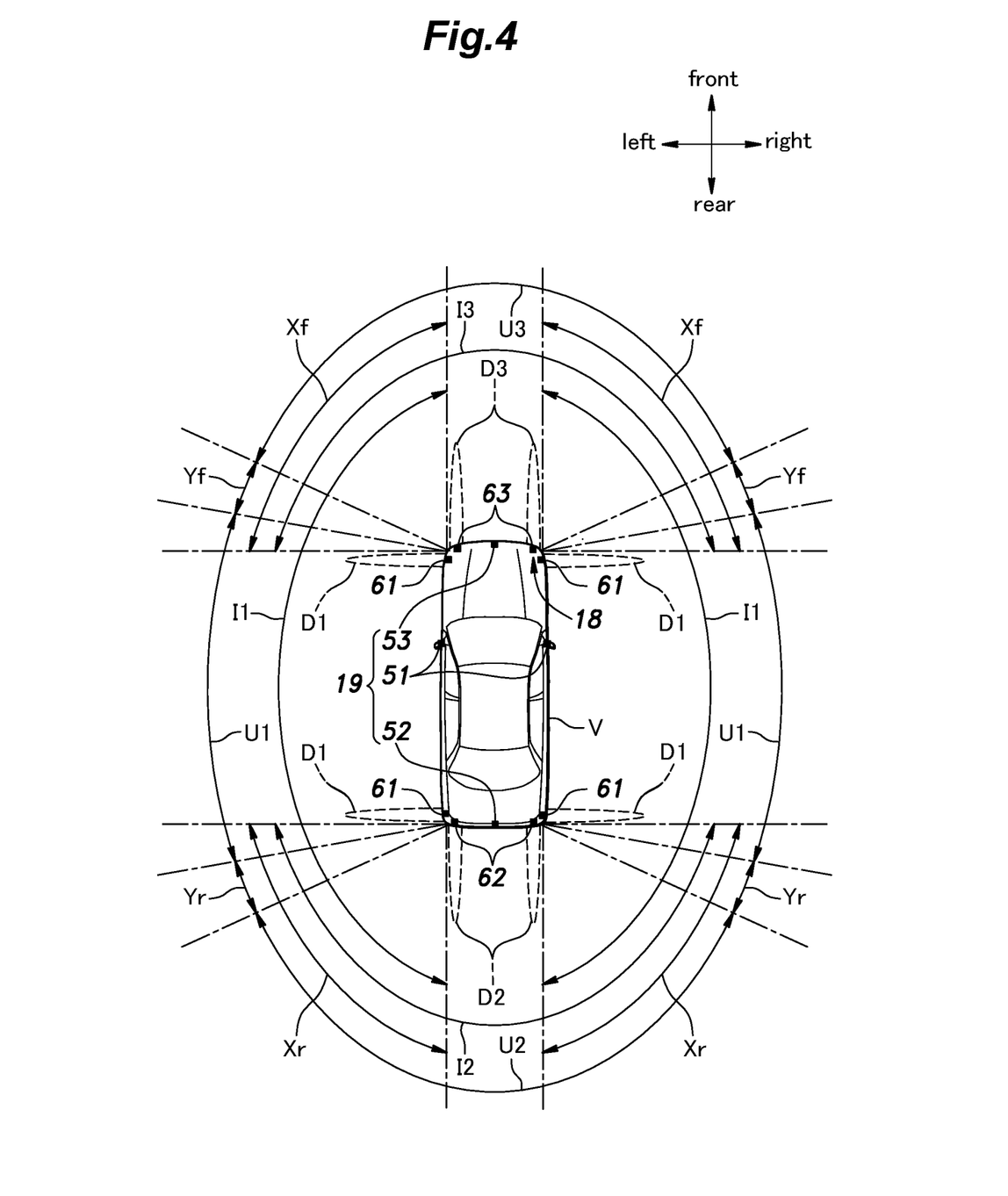
FIG. 4 is a plan view showing arrangements of external cameras and sonars in a display device for the vehicle according to the embodiment.

With reference to FIG. 4, the external cameras 19 include a pair of left and right side cameras 51 (an example of first imaging units and an example of side imaging units) provided on both lateral sides of the vehicle V, a rear camera 52 (an example of a second imaging unit and an example of a rear imaging unit) provided at the rear end of the vehicle V, and a front camera 53 (an example of a third imaging unit and an example of a front imaging unit) provided at the front end of the vehicle V.

For example, each side camera 51 is provided on or around the corresponding one of the left and right door mirrors of the vehicle V, and is arranged more forward than the fore and aft center (namely, the center in the fore and aft direction) of the vehicle V. Each side camera 51 is a camera configured to capture an image on a lateral side (a left side or a right side) of the vehicle V. A pair of arrows I1 in FIG. 4 each indicate a first imaging area I1 of each side camera 51. The first imaging area I1 of each side camera 51 is set according to the view angle (the maximum imaging angle) of each side camera 51. A pair of arrows U1 in FIG. 4 each indicate a first use area U1 included in the first imaging area I1 of each side camera 51. Each first use area U1 is an area in which only the image captured by each side camera 51 is used for the composite image.

For example, the rear camera 52 is provided on or around a back door of the vehicle V, and is located at the lateral center (namely, the center in the lateral direction) of the vehicle V. The rear camera 52 is a camera configured to capture an image on a rear side of the vehicle V. An Arrow I2 in FIG. 4 indicates a second imaging area I2 of the rear camera 52. The second imaging area I2 of the rear camera 52 is set according to the view angle (the maximum imaging angle) of the rear camera 52. An arrow U2 in FIG. 4 indicates a second use area U2 included in the second imaging area I2. The second use area U2 is an area in which only the image captured by the rear camera 52 is used for the composite image.

For example, the front camera 53 is provided on or around a front grille of the vehicle V, and is located at the lateral center of the vehicle V. The front camera 53 is a camera configured to capture an image on a front side of the vehicle V. An Arrow I3 in FIG. 4 indicates a third imaging area I3 of the front camera 53. The third imaging area I3 of the front camera 53 is set according to the view angle (the maximum imaging angle) of the front camera 53. An arrow U3 in FIG. 4 indicates a third use area U3 included in the third imaging area I3. The third use area U3 is an area in which only the image captured by the front camera 53 is used for the composite image.

Each side camera 51 and the rear camera 52 are arranged such that the first imaging area I1 of each side camera 51 and the second imaging area I2 of the rear camera 52 overlap with each other. A pair of arrows Xr in FIG. 4 each indicate a rear overlapping part Xr where the first imaging area I1 of each side camera 51 and the second imaging area I2 of the rear camera 52 overlap with each other. Each side camera 51 and the front camera 53 are arranged such that the first imaging area I1 of each side camera 51 and the third imaging area I3 of the front camera 53 overlap with each other. A pair of arrows Xf in FIG. 4 each indicate a front overlapping part Xf where the first imaging area I1 of each side camera 51 and the third imaging area I3 of the front camera 53 overlap with each other.

For example, the composite image generated by the control device 15 is a plan view image (an image corresponding to the abovementioned look-down image) in which the vehicle V and its surrounding area are looked down on from right above. In another embodiment, the composite image generated by the control device 15 may be a three-dimensional image (an image corresponding to the abovementioned bird's-eye image) in which the vehicle V and a part of its surrounding area in the travel direction are looked down on.

The control device 15 is configured to set a rear boundary area Yr in a part of each rear overlapping part Xr. Each rear boundary area Yr has a prescribed angular length in the circumferential direction. Each rear boundary area Yr is an area to be a boundary between each first use area U1 and the second use area U2 in the composite image. Namely, each rear boundary area Yr is an area to be a boundary between the image captured by each side camera 51 and the image captured by the rear camera 52 in the composite image. The control device 15 generates a rear corresponding part (namely, a part corresponding to each rear boundary area Yr) of the composite image by blending the image captured by each side camera 51 and the image captured by the rear camera 52 at a prescribed blending rate. In another embodiment, the control device 15 may set a rear boundary area Yr in the entirety of each rear overlapping part Xr. Further, in another embodiment, the control device 15 may set a rear boundary line having no angular length in the circumferential direction, instead of setting a rear boundary area Yr having an angular length in the circumferential direction.

The control device 15 is configured to set a front boundary area Yf in a part of each front overlapping part Xf Each front boundary area Yf has a prescribed angular length in the circumferential direction. Each front boundary area Yf is an area to be a boundary between each first use area U1 and the third use area U3 in the composite image. Namely, each front boundary area Yf is an area to be a boundary between the image captured by each side camera 51 and the image captured by the front camera 53 in the composite image. The control device 15 generates a front corresponding part (namely, a part corresponding to each front boundary area Yf) of the composite image by blending the image captured by each side camera 51 and the image captured by the front camera 53 at a prescribed blending rate. In another embodiment, the control device 15 may set a front boundary area Yf in the entirety of each front overlapping part Xf. Further, in another embodiment, the control device 15 may set a front boundary line having no angular length in the circumferential direction, instead of setting a front boundary area Yf having an angular length in the circumferential direction.

The touch panel 32 is configured to receive the data of the composite image from the control device 15 and to display the composite image on the display screen based on the received data of the composite image. In another embodiment, the composite image may be displayed on a display screen of a communication device (for example, a smartphone, a tablet PC, a mobile phone, a PDA, or the like) configured to communicate with the vehicle V. Namely, the image display unit is not necessarily mounted on the vehicle V.

The sonars 18 include two pairs of front and rear side sonars 61 (an example of side acquiring units) provided on both lateral sides of the vehicle V, a pair of left and right rear sonars 62 (an example of rear acquiring units) provided at the rear end of the vehicle V, and a pair of left and right front sonars 63 (an example of front acquiring units) provided at the front end of the vehicle V. In another embodiment, sensors (for example, millimeter wave radars or laser lidars) other than the sonars 18 may be used as the side acquiring units, the rear acquiring units and/or the front acquiring units.

For example, the side sonars 61 are provided at the front and rear ends of both lateral surfaces of the vehicle V. Each front side sonar 61 (namely, each side sonar 61 provided at the front end of the corresponding lateral surface of the vehicle V) is arranged more forward than the fore and aft center of the vehicle V and each side camera 51. Each rear side sonar 61 (namely, each side sonar 61 provided at the rear end of the corresponding lateral surface of the vehicle V) is arranged more rearward than the fore and aft center of the vehicle V and each side camera 51. Each side sonar 61 is a sensor configured to detect the position of the object on the corresponding lateral side of the vehicle V. Namely, each side sonar 61 is a sensor configured to acquire information about the object on the corresponding lateral side of the vehicle V. Broken lines D1 in FIG. 4 each indicate a detection area (hereinafter referred to as "first detection area D1") of each side sonar 61. Each first detection area D1 is located in the first imaging area I1 of each side camera 51. The object detecting direction of each side sonar 61 (the lateral direction) corresponds to the imaging direction of each side camera 51 (the lateral direction).

For example, the rear sonars 62 are provided at left and right ends of a rear surface of the vehicle V. The left rear sonar 62 (namely, the rear sonar 62 provided at the left end of the rear surface of the vehicle V) is located more leftward than the lateral center of the vehicle V. The right rear sonar 62 (namely, the rear sonar 62 provided at the right end of the rear surface of the vehicle V) is located more rightward than the lateral center of the vehicle V. Each rear sonar 62 is a sensor configured to detect the position of the object on the rear side of the vehicle V. Namely, each rear sonar 62 is a sensor configured to acquire information about the object on the rear side of the vehicle V. A pair of broken lines D2 in FIG. 4 each indicate a detection area (hereinafter referred to as "second detection area D2") of each rear sonar 62. Each second detection area D2 is located in the second imaging area I2 of the rear camera 52. The object detecting direction of each rear sonar 62 (the backward direction) corresponds to the imaging direction of the rear camera 52 (the backward direction).

For example, the front sonars 63 are provided at left and right ends of a front surface of the vehicle V. The left front sonar 63 (namely, the front sonar 63 provided at the left end of the front surface of the vehicle V) is located more leftward than the lateral center of the vehicle V. The right front sonar 63 (namely, the front sonar 63 provided at the right end of the front surface of the vehicle V) is located more rightward than the lateral center of the vehicle V. Each front sonar 63 is a sensor configured to detect the position of the object on the front side of the vehicle V. Namely, each front sonar 63 is a sensor configured to acquire information about the object on the front side of the vehicle V. A pair of broken lines D3 in FIG. 4 each indicate a detection area (hereinafter referred to as "third detection area D3") of each front sonar 63. Each third detection area D3 is located in the third imaging area I3 of the front camera 53. The object detecting direction of each front sonar 63 (the forward direction) corresponds to the imaging direction of the front camera 53 (the forward direction).

<The Movement of Each Boundary Area Yr, Yf>

Regarding the display device 3 with the abovementioned configuration, in a case where no sonar 18 detects the object around the vehicle V, each boundary area Yr, Yf is set to a prescribed reference position (see FIG. 4). In the following, the problem in always setting each boundary area Yr, Yf to the reference position will be described.

Figure 5:
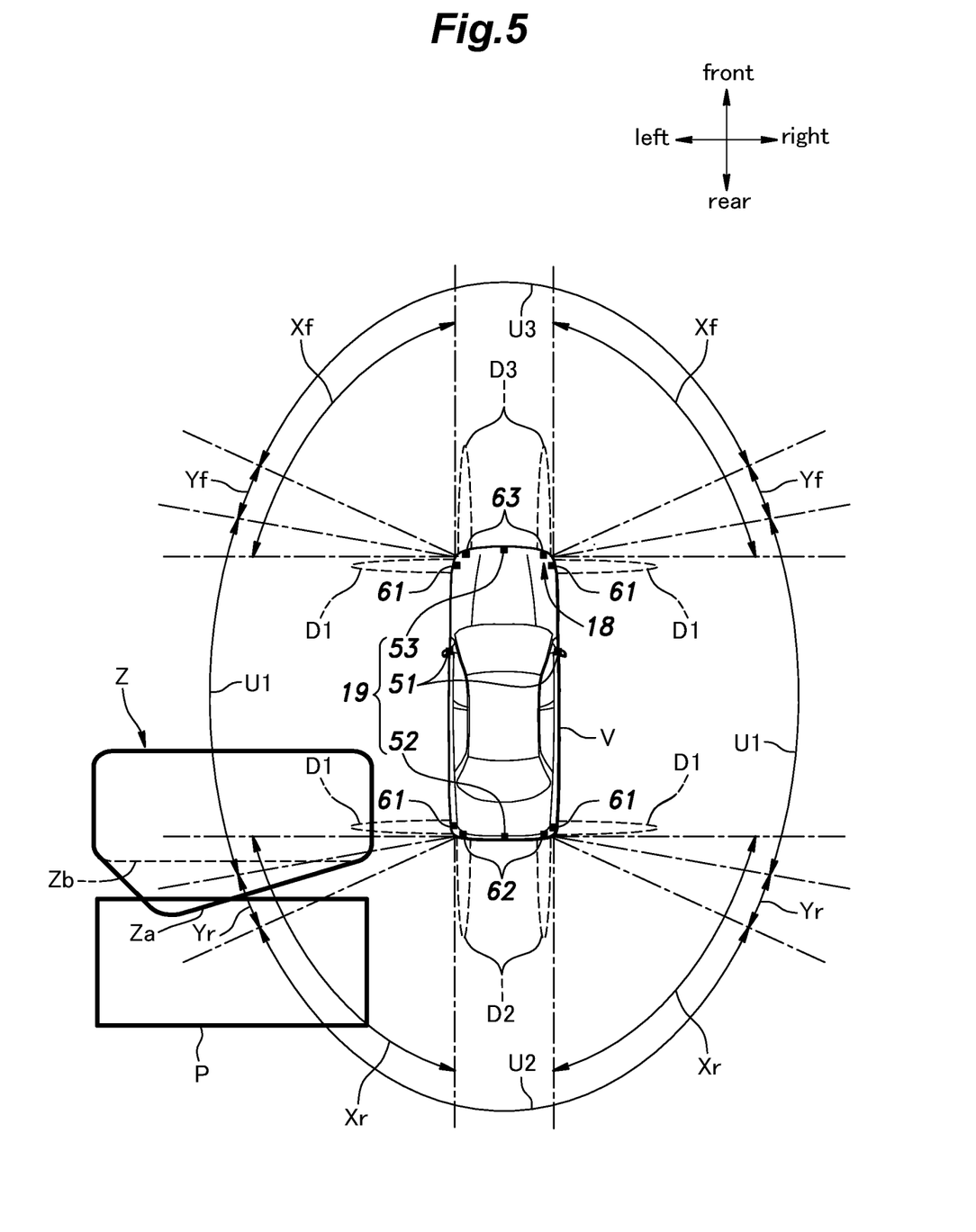
FIG. 5 is a plan view illustrating the display of a composite image in a case where a boundary is not moved when a rear side sonar detects an object in the display device for the vehicle according to the embodiment.
Figure 6:
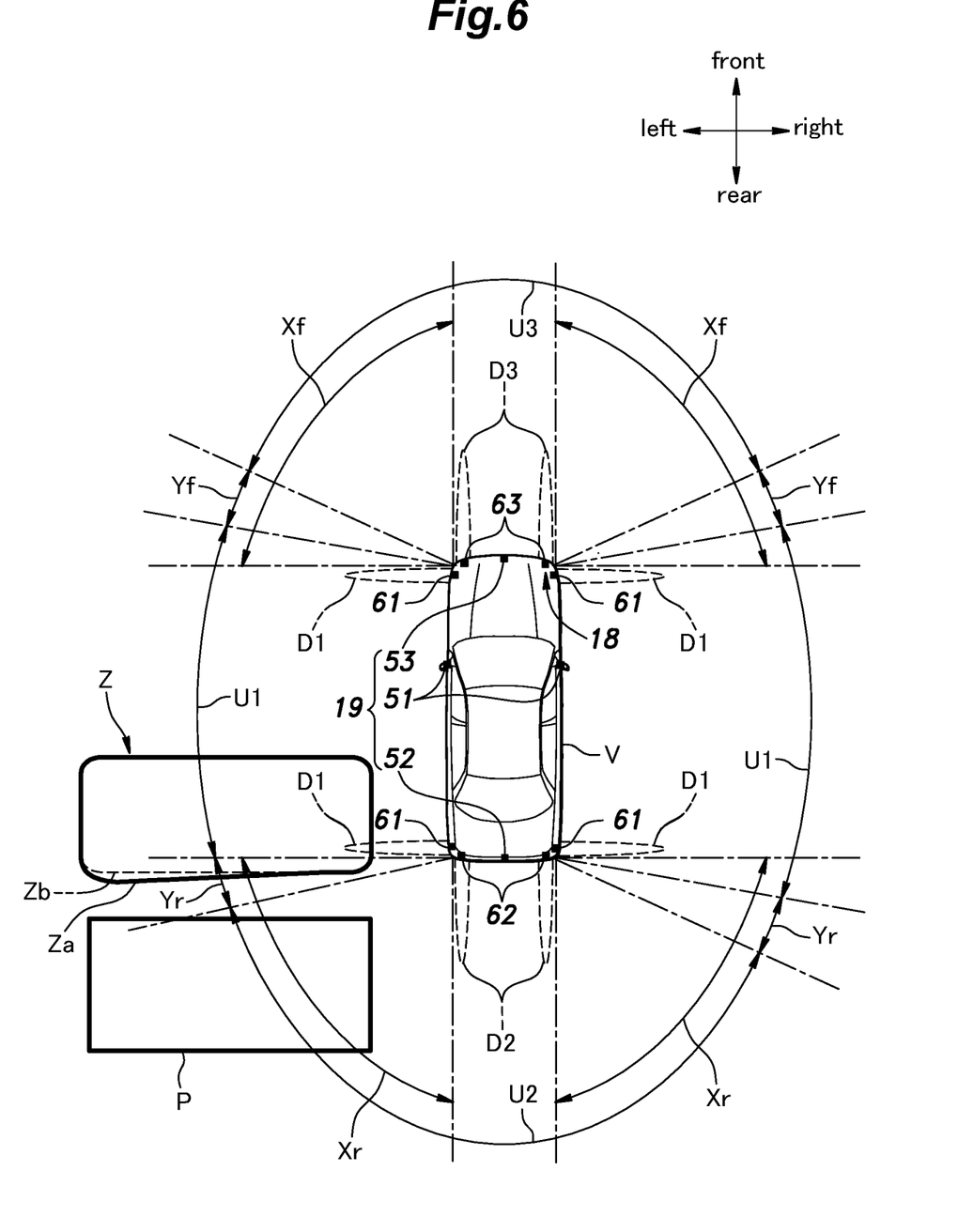
FIG. 6 is a plan view illustrating the display of the composite image in a case where the boundary is moved when the rear side sonar detects the object in the display device for the vehicle according to the embodiment.

FIGS. 5 and 6 show a state in which the rear side sonar 61 on the left side (hereinafter, simply referred to as "the rear side sonar 61") detects the position of the object Z (for example, another vehicle parked around the vehicle V) on the lateral side of the rear part of the vehicle V. In this state, a rear part of the object Z falls into a blind spot of the side camera 51 on the left side (hereinafter, simply referred to as "the side camera 51"), and thus it is difficult for the side camera 51 to capture the rear part of the object Z. Accordingly, as shown in FIG. 5, if the control device 15 generates the composite image in a state where each rear boundary area Yr is set to the reference position, the rear surface Za of the object Z in the composite image greatly protrudes more backward than the rear surface Zb of the object Z in the actual space. If such a situation occurs while the touch panel 32 is displaying the parking position candidate P in the composite image (see step ST2 of the abovementioned automatic parking process), the object Z and the parking position candidate P may overlap with each other in the composite image even though they do not overlap with each other in the actual space. Consequently, the occupant may mistakenly think that the vehicle V cannot be parked at the parking position candidate P even though the touch panel 32 displays an appropriate parking position candidate P.

To solve such a problem, as shown in FIG. 6, in a case where the rear side sonar 61 detects the position of the object Z, the control device 15 moves the rear boundary area Yr on the left side (hereinafter, simply referred to as "the rear boundary area Yr") from the reference position to the front side of the vehicle V. Namely, the control device 15 moves the rear boundary area Yr such that the rear boundary area Yr gets closer to the side camera 51. Accordingly, the second use area U2 of the rear camera 52 is enlarged, while the first use area U1 of the side camera 51 is reduced. Accordingly, it is possible to enhance the accuracy of the position of the object Z in the composite image and to suppress the deviation of the rear surface Za of the object Z in the composite image from the rear surface Zb of the object Z in the actual space. Thus, it is possible to reduce the occurrence of a situation in which the object Z and the parking position candidate P overlap with each other in the composite image even though they do not overlap with each other in the actual space. Accordingly, the parking assist system 1 can be more convenient. As described above, in the present embodiment, the rear boundary area Yr is changed in a case where the rear side sonar 61 detects the position of the object Z. Accordingly, it is possible to generate an appropriate composite image according to the position of the object Z around the vehicle V.

Also, in the present embodiment, the control device 15 moves the rear boundary area Yr such that the rear boundary area Yr after a movement thereof (see FIG. 6) overlaps with the rear boundary area Yr before the movement thereof (see FIG. 4). Thus, it is possible to suppress the discomfort caused by the movement of the rear boundary area Yr by reducing the movement length of the rear boundary area Yr. In another embodiment, the control device 15 may move the rear boundary area Yr such that the rear boundary area Yr after the movement thereof (see FIG. 6) does not overlap with the rear boundary area Yr before the movement thereof (see FIG. 4).

Further, in the present embodiment, the control device 15 does not move each boundary area Yr, Yf from the reference position in the following cases 1 to 3.

[case 1] The rear side sonar 61 does not detect the position of the object Z on the lateral side of the rear part of the vehicle V, while the front side sonar 61 detects the position of the object Z on the lateral side of the front part of the vehicle V.

[case 2] The rear side sonar 61 does not detect the position of the object Z on the lateral side of the rear part of the vehicle V, while the rear sonar 62 detects the position of the object Z on the rear side of the vehicle V.

[case 3] The rear side sonar 61 does not detect the position of the object Z on the lateral side of the rear part of the vehicle V, while the front sonar 63 detects the position of the object Z on the front side of the vehicle V.

Accordingly, it is possible to suppress the discomfort caused by the movement of each boundary area Yr, Yf by reducing an unnecessary movement of each boundary area Yr, Yf.

Further, in the present embodiment, the control device 15 moves each boundary area Yr, Yf from the reference position in the following cases I to III.

[case I] The rear side sonar 61 detects the position of the object Z on the lateral side of the rear part of the vehicle V, and the front side sonar 61 detects the position of the object Z on the lateral side of the front part of the vehicle V.

[case II] The rear side sonar 61 detects the position of the object Z on the lateral side of the rear part of the vehicle V, and the rear sonar 62 detects the position of the object Z on the rear side of the vehicle V.

[case III] The rear side sonar 61 detects the position of the object Z on the lateral side of the rear part of the vehicle V, and the front sonar 63 detects the position of the object Z on the front side of the vehicle V.

Accordingly, it is possible to suppress the deviation of the position of the object Z in the composite image from the position of the object Z in the actual space, in a case where the object Z is present not only on the lateral side of the rear part of the vehicle V but also on the lateral side of the front part of the vehicle V, on the front side of the vehicle V, or on the rear side of the vehicle V.

In the present embodiment, in a case where the rear side sonar 61 detects the position of the object Z, the control device 15 moves the rear boundary area Yr. On the other hand, in another embodiment, in a case where the rear side sonar 61 detects the position of the object Z, the control device 15 may change the blending rate of the captured images in the rear corresponding part (namely, the part corresponding to the rear boundary area Yr) of the composite image. For example, in a case where the rear side sonar 61 detects the position of the object Z, the control device 15 may change the blending rate of the captured images in the rear corresponding part of the composite image such that a proportion of the image captured by the rear camera 52 increases and a proportion of the image captured by the side camera 51 decreases as compared with a case where the rear side sonar 61 does not detect the position of the object Z. Accordingly, similar to the present embodiment, it is possible to enhance the accuracy of the position of the object Z in the composite image. Further, in still another embodiment, in a case where the rear side sonar 61 detects the position of the object Z, the control device 15 may move the rear boundary area Yr and change the blending rate of the captured images.

In the present embodiment, in a case where the rear side sonar 61 detects the position of the object Z, the control device 15 moves the rear boundary area Yr. On the other hand, in another embodiment, in a case where the sonar 18 other than the rear side sonar 61 detects the position of the object Z, the control device 15 may move at least one boundary area Yr, Yf. In this way, the combination of the sonar 18 that detects the position of the object Z and each boundary area Yr, Yf to be moved can be freely determined according to the arrangements of the external cameras 19 or the like.

In the present embodiment, the display device 3 is applied to the parking assist system 1 configured to execute selected one of the automatic parking process and the automatic unparking process of the vehicle V. On the other hand, in another embodiment, the display device 3 may be applied to a vehicle system (for example, a vehicle travel system) other than the parking assist system 1.

Concrete embodiments of the present invention have been described in the foregoing, but the present invention should not be limited by the foregoing embodiments and various modifications and alterations are possible within the scope of the present invention.

The invention claimed is:

1. A display device for a vehicle, comprising:
a plurality of imaging units configured to capture images around the vehicle;
an image compositing unit configured to composite the images captured by the imaging units to generate a composite image;
an image display unit configured to display the composite image generated by the image compositing unit; and
an acquiring unit configured to acquire information about an object around the vehicle,
wherein the imaging units are arranged such that imaging areas thereof overlap with each other,
the image compositing unit is configured to set a boundary between the captured images in the composite image such that the boundary is provided in a part where the imaging areas of the imaging units overlap with each other, and
in a case where the acquiring unit acquires the information about the object, the image compositing unit changes the boundary,
wherein the imaging units include a first imaging unit configured to capture an image in a first imaging area and a second imaging unit configured to capture an image in a second imaging area that overlaps with the first imaging area,
the acquiring unit is configured to acquire the information about the object in the first imaging area, and
in the case where the acquiring unit acquires the information about the object, the image compositing unit moves the boundary such that the boundary gets closer to the first imaging unit as compared with a case where the acquiring unit does not acquire the information about the object, wherein the boundary has a prescribed angular length in a circumferential direction around the vehicle, and
in the case where the acquiring unit acquires the information about the object, the image compositing unit moves the boundary such that the boundary after a movement thereof overlaps with a boundary before the movement thereof.

2. The display device according to claim 1, wherein in the case where the acquiring unit acquires the information about the object, the image compositing unit enlarges a use area of the image captured by the second imaging unit and reduces a use area of the image captured by the first imaging unit as compared with the case where the acquiring unit does not acquire the information about the object.

3. The display device according to claim 1, wherein the first imaging unit includes a side imaging unit configured to capture an image on a lateral side of the vehicle, the second imaging unit includes a rear imaging unit configured to capture an image on a rear side of the vehicle,
the acquiring unit includes at least one side acquiring unit configured to acquire the information about the object on the lateral side of the vehicle, and
in a case where the side acquiring unit acquires the information about the object, the image compositing unit moves the boundary to a front side of the vehicle as compared with a case where the side acquiring unit does not acquire the information about the object.

4. The display device according to claim 3, wherein the side imaging unit is arranged more forward than a fore and aft center of the vehicle,
the at least one side acquiring unit comprises a plurality of side acquiring units including a front side acquiring unit arranged more forward than the fore and aft center of the vehicle and a rear side acquiring unit arranged more rearward than the fore and aft center of the vehicle, and
in a case where the rear side acquiring unit acquires the information about the object, the image compositing unit moves the boundary to the front side of the vehicle as compared with a case where the rear side acquiring unit does not acquire the information about the object.

5. The display device according to claim 3, further comprising a front acquiring unit configured to acquire the information about the object on the front side of the vehicle and a rear acquiring unit configured to acquire the information about the object on the rear side of the vehicle, the front acquiring unit and the rear acquiring unit being separate from the side acquiring unit,
wherein in a case where the front acquiring unit or the rear acquiring unit acquires the information about the object, the image compositing unit does not move the boundary.

6. The display device according to claim 3, further comprising a front acquiring unit configured to acquire the information about the object on the front side of the vehicle and a rear acquiring unit configured to acquire the information about the object on the rear side of the vehicle, the front acquiring unit and the rear acquiring unit being separate from the side acquiring unit,
wherein in a case where the front acquiring unit or the rear acquiring unit acquires the information about the object, the image compositing unit moves the boundary.

7. The display device according to claim 1, wherein the composite image generated by the image compositing unit is a plan view image in which the vehicle is looked down on from right above.

8. A parking assist system comprising the display device according to claim 1, wherein the image display unit is configured to display a parking position candidate in the composite image.

* * * * *